United States Patent [19]

Wright

[11] 4,284,514

[45] Aug. 18, 1981

[54] TREATMENT OF HAZARDOUS WASTE

[75] Inventor: David R. Wright, Tring, England

[73] Assignee: Stablex A.G., Zug, Switzerland

[21] Appl. No.: 105,712

[22] Filed: Dec. 20, 1979

[30] Foreign Application Priority Data

Dec. 29, 1978 [GB] United Kingdom ............... 50209/78

[51] Int. Cl.³ ............................. C02F 1/52; C02F 1/72
[52] U.S. Cl. ................................... 210/721; 210/724; 210/738; 210/751; 210/904; 210/913
[58] Field of Search ............. 204/DIG. 13; 210/42 R, 210/45, 46, 49, 50-53, 59, 65, 73 S, 173, 174, 702, 710, 714, 723-728, 738, 751, 806; 241/278 R, DIG. 38; 252/301.1 W

[56] References Cited

U.S. PATENT DOCUMENTS

| 3,366,716 | 1/1968 | Cohen | 252/301.1 W |
| 3,713,594 | 1/1973 | Blakeley et al. | 241/DIG. 38 |
| 4,059,514 | 11/1977 | Jahnsen | 210/DIG. 31 |

FOREIGN PATENT DOCUMENTS

| 793823 | 9/1968 | Canada | 210/174 |
| 50-50288 | 5/1975 | Japan | 210/DIG. 30 |
| 52-33883 | 3/1977 | Japan | 210/DIG. 31 |
| 1437598 | 5/1976 | United Kingdom | 252/301.1 W |
| 1485625 | 9/1977 | United Kingdom | |

*Primary Examiner*—Peter A. Hruskoci
*Attorney, Agent, or Firm*—Stevens, Davis, Miller & Mosher

[57] ABSTRACT

In a process for pretreating hazardous waste prior to solidification the waste is received in containers (10). The containers are deposited in a large vessel containing a chemical pretreatment media (9) and subjected to an agitating process in the vessel whereby the containers are ruptured and their contents deposited in the media. Neutralization, precipitation and chemical modification processes are envisaged in the container. After pretreatment the liquid is removed for ultimate solidification.

13 Claims, 1 Drawing Figure

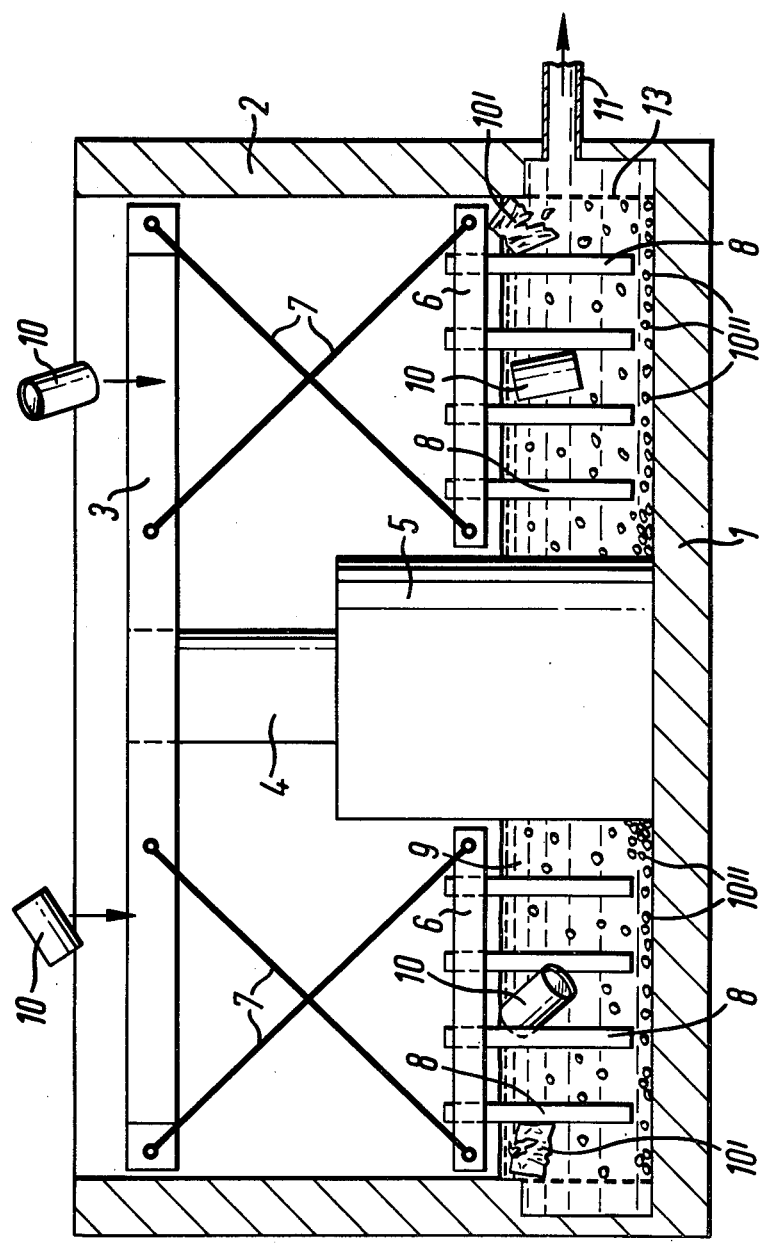

TREATMENT OF HAZARDOUS WASTE

DESCRIPTION

The present invention is concerned with the reception of hazardous waste at a plant for carrying out detoxifying processes. The detoxification processes with which the present invention are particularly concerned conclude with solidification of the waste. Preferentially the waste, in liquid form, has added to it fly ash or equivalent and Portland cement thereby forming a slurry which sets to a harmless synthetic rock. Such a solidification process forms the subject of British Patent Specification No. 1,485,625.

Up to the present time the normal practice has been for liquid hazardous waste to arrive in large valve controlled tanks which are discharged into a reception vessel. The solidification process referred to above is best carried out under chemically neutral conditions and it is preferred that the hazardous component of the waste is in a water-insoluble form dispersed rather than dissolved in the waste. A further requirement may be chemically to modify the waste for example to reduce its hazard immediately on arrival at the plant. In summary some kind of chemical pretreatment is needed in the plant before solidification.

If the producer of the waste does not have sufficient to load a large container such as a tanker he must store the waste in small sealed containers such as drums for storage and transport to the waste disposal plant. The opening and emptying of such containers at the plant is a potentially hazardous operation.

According to the present invention there is provided a process for pretreating hazardous waste received in containers at a waste disposal plant, such method comprising placing the containers unopened in a vessel containing a pretreatment media and submitting the containers in the vessel to an agitating process which ruptures the containers thereby depositing the contents into the vessel to be acted upon by the pretreatment media.

The waste in the received containers may be in liquid form but the invention provides the capability of receiving for ultimate solidification containers of solid waste. Such waste may have solidified from liquid during storage or transit or may originally be in solid form. It will be appreciated that whilst hazardous waste in liquid form is a difficult and dangerous substance it is a necessary starting point for the ultimate solidification processes presently envisaged.

The vessel in which the agitating process takes place can conveniently be comprised by a large basin having a central bearing around which agitating members rotate. Thus, in an embodiment, a vertical shaft extends from a central bearing and radially extending arms carry dependent harrow members which travel around the interior of the basin thereby agitating and rupturing the drums and ultimately thoroughly mixing the contents. A suitable device is that known as a "wash mill" and used in the cement industry for reducing the size of soft rock for blending as a cement-making slurry. The harrows not only rupture the drums received into the vessel but reduce these drums ultimately to small compact balls of metal which assist in the agitating and mixing process.

The three types of chemical pretreatment basically contemplated are firstly neutralisation, secondly precipitation of the soluble hazardous component into an insoluble form and thirdly a specific chemical treatment for other purposes.

The expression neutralisation in the first type covers any pH adjustment away from extreme acidity or basicity. With regard to the second it is desirable, in principle, to fix the hazardous part of the ultimate solidified synthetic rock in insoluble form as it is then less readily dissolved and leached out by ground water. With regard to the third type the oxidation of cyanides to cyanates is specifically contemplated. The pretreatment media may be, or be derived from other liquid hazardous wastes.

The invention will now be described by way of example and with reference to the acompanying diagrammatic drawing of an apparatus for carrying out of the method, and by examples of pretreatment processes.

Referring initially to the drawing a large reception vessel approximately 10 meters in diameter comprises an octagonal base 1 and side walls 2 also of also of octagonal section. A sieve member 13 provides an inner side wall for purposes which will hereinafter be described. A shaft 4 extends upwardly from a bearing support 5 and is driven to rotate by an appropriate power source. Rotor arms 3 extend radially outwardly from the upper end part of shaft 4 so as to be driven thereby. Conveniently there are four arms 3 disposed at 90° intervals. A harrow member 6 is suspended from each arm 3 by chains 7 and has dependant removable and replaceable teeth 8.

In use pretreatment liquid or at least mobile media 9 is contained in the lower part of the receptacle and the shaft rotated and the harrows 6 caused to describe a circular path agitating and mixing the media. Drums 10 typically ¾ meter long and ½ meter in diameter, are deposited into the receptacle and an unruptured cylindrical drum is illustrated falling into the vessel. The drums 10 are moved by the harrow blades and during this movement the harrow teeth wedge drums against the walls of the receptacle adjacent teeth and other drums and after a short period each drum us ruptured. A ruptured drum 10' without some of its contents, which have entered media 9, is schematically illustrated. The drums are reduced to small metal balls 10" which assist in the mixing and agitating function. Ultimately the metal balls 10" disappear and go into solution where they may be chemically active. Centrifugal force tends to move liquid outwardly and through the sieve wall 3 thereby retaining larger particles in the main body of the vessel. Treated liquid is pumped away through outlet 11 for ultimate solidification.

The following examples illustrate the use of the apparatus decribed with reference to the drawing for the pretreatment processes of various containerised wastes.

EXAMPLE 1

Neutralisation

A waste sludge containing 7% Aluminium chloride with an excess of 4% Hydrochloric acid was received in drums from a chemical manufacturer and had a pH of 3.0. 10 tons of this sludge were added to 1 ton of lime in suspension in water (media 9) using the procedure described above. The resultant liquid, a viscous sludge, had a pH of 10–11.

EXAMPLE 2

Precipitation of Hazardous Waste and Neutralisation

A spent plating sludge with 5.2% Copper in 13% Sulphuric acid solution had a pH of 0.6. The waste was treated as described above in a media (9) containing lime and some alkali hydroxide waste. The pH was raised to 12-13 and the Copper was precipitated as an insoluble hydroxide. Smaller amounts of Iron (720 ppm) and Nickel (27 ppm) associated in the waste were also rendered insoluble.

EXAMPLE 3

Chemical Modification

Solidified Cyanide waste from a metal heat treatment plant had a Cyanide content of 6%, and also 60 ppm of Sulphide. Large grey lumps of this solid material were treated as described above in a media (9) in which a suspension of lime in water was present to ensure alkalinity. When the lumps were broken down Sodium hypochlorite solution (15% available chlorine) was added to oxidise both cyanide to cyanate and sulphide to sulphate. 10 tons of waste required 12 tons of Sodium hypochlorite solution and 3 tons of lime to produce a slurry of pH 9.5-10.

EXAMPLE 4

Chemical Modification 10 tons of fused Barium salts as grey lumps with a pH of 10.8 were added in the process described above to a media (9) consisting of 20 tons of liquor from the neutralisation of mixed acid wastes, mainly sulphuric acid. As a result the slightly soluble baryta was precipitated as barium sulphate. Traces of Iron (1200 ppm), Nickel (25 ppm), Lead (39 ppm), Zinc (10 ppm) were also precipitated in the slurry which had a pH of 10.

EXAMPLE 5

Stepwise Chemical Modification

A sludge from a Zinc and Cadmium plating shop contained 4.6% Cyanide and 2.6% Copper and had a pH of 10.3. In the process described above media 9 is a suspension of 3 tonnes of lime. 10 tons of waste were deposited in the media so ensuring the alkalinity necessary to precipitate the Copper as well as the Iron (420 ppm), Nickel (110 ppm), Zinc (600 ppm), Cadmium (400 ppm), Chromium (19 ppm) and Lead (16 ppm). 16 tons of Sodium hypochlorite solution (15% available chlorine) were then added to the media and stirred at intervals by harrows 6 to oxidise cyanides to cyanates.

When this was completed 1.2 tons of Ferrous sulphate hydrate were added to destroy the excess of Sodium hypochlorite and also to reduce the Chromium from the Chromic to the less soluble Chromous state. The final pH was 9.5.

I claim:

1. A process for pretreating hazardous waste received in containers at a waste disposal plant prior to solidification, such method comprising placing the containers unopened in a vessel containing a liquid pretreatment media which neutralizes, precipitates or chemically modifies said hazardous waste, submitting the containers in the vessel to an agitating process which ruptures the containers thereby depositing the hazardous waste into the vessel to be acted upon by the pretreatment media thoroughly mixing said hazardous waste and pretreatment media to form a treated liquid and reduce said containers to particles, and removing said treated liquid from said vessel for solidification.

2. A method as claimed in claim 1 wherein the agitating process is carried out in the vessel by members depending from arms rotatably driven by an upstanding shaft in the central part of the receptacle.

3. A method as claimed in claim 1 or 2 wherein the pretreatment media is a neutralising media.

4. The method of claim 3 wherein at least two pretreatment media are successively added to carry out more than one pretreatment step.

5. A method as claimed in either claim 1 or claim 2 wherein the hazardous waste comprises a soluble hazardous component and the pretreatment media comprises a substance which reacts with the soluble component to precipitate it as an insoluble component.

6. The method of claim 5 wherein at least two pretreatment media are successively added to carry out more than one pretreatment step.

7. A method as claimed in either claim 1 or claim 2 wherein the media comprises a chemically modifying agent and the waste in the containers requires chemical modification prior to solidification.

8. The method of claim 7 wherein at least two pretreatment media are successively added to carry out more than one pretreatment step.

9. A method as claimed in claim 7 wherein the waste contains a cyanide and the media is an oxidising agent to convert the cyanide to a cyanate.

10. The method of claim 9 wherein at least two pretreatment media are successively added to carry out more than one pretreatment step.

11. A method as claimed in claim 1 or 2, wherein at least two pretreatment media are successively added to carry out more than one pretreatment step.

12. A method as claimed in claim 1 or 2 wherein the pretreatment media is, or is derived from, a hazardous waste.

13. In a process for disposing of a hazardous waste material by a solidification process which converts said waste material into a harmless synthetic rock, the improved process for handling closed containers in which the said hazardous waste material is confined while avoiding contact with the hazardous waste material comprising placing the closed containers in a vessel which contains a liquid pretreatment media which neutralizes, precipitates or chemically modifies said hazardous waste material and reduces it hazardous characteristics, agitating the said liquid pretreatment media to move the containers in the liquid pretreatment media and rupture the containers thoroughly mixing said hazardous waste and pretreatment media to form a treated liquid and reduce said containers to particles, and removing said treated liquid from said vessel for solidification.

* * * * *